US007483387B2

(12) United States Patent
Guichard et al.

(10) Patent No.: US 7,483,387 B2
(45) Date of Patent: Jan. 27, 2009

(54) HIERARCHICAL LABEL DISTRIBUTION FOR INTER-AREA SUMMARIZATION OF EDGE-DEVICE ADDRESSES

(75) Inventors: James Guichard, Groton, MA (US); Daniel C. Tappan, Boxborough, MA (US); Jean-Philippe Vasseur, Dunstable, MA (US); Simon Spraggs, Hayling Island Hants (GB)

(73) Assignee: Cisco Technology, Inc., San Jose, CA (US)

( * ) Notice: Subject to any disclaimer, the term of this patent is extended or adjusted under 35 U.S.C. 154(b) by 640 days.

(21) Appl. No.: 11/135,600

(22) Filed: May 23, 2005

(65) Prior Publication Data

US 2006/0262735 A1  Nov. 23, 2006

(51) Int. Cl.
*H04L 12/26* (2006.01)
*H04L 12/28* (2006.01)
*H04L 12/56* (2006.01)

(52) U.S. Cl. .............. 370/252; 370/254; 370/255; 370/389; 370/392; 370/401

(58) Field of Classification Search .......... 370/401, 370/252
See application file for complete search history.

(56) References Cited

U.S. PATENT DOCUMENTS

| 6,473,421 | B1  |  10/2002 | Tappan ............... 370/351 |
|---|---|---|---|
| 6,483,833 | B1* | 11/2002 | Jagannath et al. ........ 370/392 |
| 6,567,380 | B1  |  5/2003 | Chen ................ 370/238 |
| 6,603,756 | B1  |  8/2003 | Tappan ............... 370/351 |
| 6,883,034 | B1  |  4/2005 | Pelavin et al. .......... 709/242 |
| 7,061,911 | B2* |  6/2006 | Furuno ............... 370/392 |
| 7,263,061 | B2* |  8/2007 | Yamada .............. 370/217 |
| 2004/0081154 | A1 |  4/2004 | Kouvelas ............. 370/392 |
| 2004/0223500 | A1* | 11/2004 | Snaderson et al. ...... 370/395.53 |
| 2005/0025075 | A1  |  2/2005 | Dutt et al. ............ 370/299 |

OTHER PUBLICATIONS

E. Rosen and Y. Rekhter, "BGP/MPLS VPNs," Request for Comments 2547, Mar. 1999.
Coltun, R., "The OSPF Opaque LSA Option," Request for Comments 2370, Jul. 1998.

(Continued)

*Primary Examiner*—Steven H Nguyen
*Assistant Examiner*—Cassandra Decker
(74) *Attorney, Agent, or Firm*—Cesari and McKenna LLP

(57) ABSTRACT

A system and method are provided for separately distributing edge-device labels and routing information across routing areas of a computer network. Because the edge-device labels are distributed separately from network routing information, the process of distributing the edge-device labels does not preclude conventional edge-device address summarizations. Illustratively, a novel "label mapping" LSA is employed for distributing the edge-device labels across routing areas. The label-mapping LSA may be embodied as an area-scope OSPF opaque LSA (type 10) or an IS-IS LSP containing TLVs of area scope. Advantageously, the present invention is generally applicable whenever label values are allocated to edge devices in a multi-area computer network and data is "tunneled" through the network from one edge device to another.

24 Claims, 12 Drawing Sheets

OTHER PUBLICATIONS

Callon, Ross W., "Use of OSI IS-IS for Routing in TCP/IP and Dual Environments," Request for Comments 1195, Dec. 1990.
Moy, J., "OSPF Version 2," Request for Comments 2328, Apr. 1998.
Tanenbaum, Andrew S., "Computer Networks," Fourth Edition, Section 1.4.2 pp. 41-44, 2003.
Perlman, Radia, "Interconnections Second Edition: Bridges, Routers, Switches, and Internetworking Protocols," Chapter 9, pp. 189-220, 2000.
Thomas, Stephen A., "IP Switching and Routing Essentials,"Chapter 7, pp. 221-243, 2002.

* cited by examiner

HIERARCHICAL LABEL DISTRIBUTION FOR INTER-AREA SUMMARIZATION OF EDGE-DEVICE ADDRESSES

FIELD OF THE INVENTION

This invention relates generally to dissemination of routing and forwarding information in a computer network, and, more specifically, to a technique for efficiently distributing forwarding labels across different routing areas without disrupting conventional inter-area summarization of edge-device addresses.

BACKGROUND OF THE INVENTION

A computer network is a geographically distributed collection of interconnected subnetworks, such as local area networks (LAN), that transport data between network nodes. As used herein, a network node is any device adapted to send and/or receive data in the computer network. Thus, in the context of this disclosure, the terms "node" and "device" may be used interchangeably. The network topology is defined by an arrangement of network nodes that communicate with one another, typically through one or more intermediate network nodes, such as routers and switches. In addition to intra-network communications between network nodes located in the same network, data also may be exchanged between nodes located in different networks. To that end, an "edge device" located at the logical outer-bound of a first computer network may be adapted to send and receive data with an edge device situated in a neighboring (i.e., adjacent) network. Inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its destination. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). In this case, a first node in the subnetwork may be assigned to the IP address 128.0.10.1, whereas a second node may be assigned to the IP address 128.0.10.2.

Although IPv4 is prevalent in most networks today, IP Version 6 (IPv6) has been introduced to increase the length of an IP address to 128 bits (16 bytes), thereby increasing the number of available IP addresses. For purposes of discussion, IP addresses will be represented as IPv4 addresses hereinafter, although those skilled in the art will appreciate that IPv6 or other layer-3 address formats alternatively may be used in the illustrative embodiments described herein.

A subnetwork is often associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Inter-connections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to address the subnetwork 128.0.10.4, and the remaining two address bits may be used to distinctly address either of the two nodes in the subnetwork. In this case, the subnetwork may be associated with a subnet mask length of /30 (i.e., its subnet mask equals 0xFFFFFFFC in hexadecimal) since only the first 30 most-significant bits of an IP address are required to uniquely address subnetwork 128.0.10.4. As used herein, an "address prefix" is defined as the result of applying a subnet mask to a network address. An address prefix therefore specifies a range of network addresses in a subnetwork, and a /32 address prefix corresponds to a particular network address. A "route" is defined herein as an address prefix and its associated path attributes.

Two or more address prefixes may be aggregated if they specify contiguous ranges of network addresses or if one prefix's range of addresses is a superset of the other prefixes'. For example, consider the address prefixes 128.52.10.0 /24 and 128.52.10.5 /30. Since the prefix 128.52.10.0 /24 includes every IP address in the subnetwork described by the prefix 128.52.10.5 /30, the two prefixes may be aggregated as a single prefix 128.52.10.0 /24. By way of further example, the prefixes 128.52.10.0 /25 and 128.52.10.128 /25 respectively specify contiguous ranges of IP addresses 128.52.10.0-127 and 128.52.10.128-255. Accordingly, these two prefixes may be aggregated as a single address prefix 128.52.10.0 /24 which contains both IP address ranges.

Prefix aggregation (or "route aggregation") is especially useful when installing routes in a forwarding information base (FIB). As noted, IP-based data packets include source and destination IP addresses that identify the packet's sending and receiving nodes. Packet-forwarding determinations are typically made based on the value of the packet's destination IP address. Specifically, the destination address may be parsed to determine the packet's next hop. FIG. 1A illustrates an exemplary IP-based FIB 100 that may be used to parse a packet's destination IP address to determine the packet's next hop. For purposes of illustration and description, the exemplary FIB is arranged as a 4×8 multiway trie (MTRIE), although those skilled in the art will understand that other searchable data structures alternatively may be employed. Moreover, non-IP-based FIBs also may be employed when a packet's next-hop information can be determined based on, e.g., the value of a layer-2 identifier, such as virtual-circuit identifier or the like.

The MTRIE is a searchable tree structure having four levels 110-140, where the top-most level is a 256-entry "root" vector 110. Each entry 112 in the root vector is indexed to correspond to a particular value between 0 and 255. To perform an address lookup in the MTRIE, the first 8 most-significant bits of a packet's destination IP address are used to uniquely index a root-vector entry 112. The indexed entry 112 may store a pointer to a second-level vector 120, a pointer to the packet's next-hop information 150 or a predetermined null value. If the indexed entry references the packet's next-hop information, the packet may be forwarded to its next-hop destination. However, if the indexed entry references a second-level vector 120, the next 8 most-significant bits of the destination IP address are used to index an entry 122 in the second-level vector.

The indexed second-level vector entry 122 may reference a third-level vector 130, or may reference the location of the packet's next-hop forwarding information 150. In the former case, an entry 132 in the referenced third-level vector 130 may be indexed by the next 8 most-significant bits of the packet's destination IP address. The indexed entry 132, in turn, may store a pointer that references a fourth-level vector 140. Because the MTRIE contains only four levels, the 8 least-significant bits of the destination IP address are used to locate a matching fourth-level entry 142, which stores a pointer to the packet's next-hop information 150. In this manner, the MTRIE is "walked," eight bits at a time, until the packet's next-hop information 150 is located. As shown, the exemplary 4×8 MTRIE contains entries 142 that reference next-hop information 150a and 150b for the destination IP addresses 10.1.1.1 /32 and 10.1.1.2 /32.

FIG. 1B illustrates the exemplary FIB 100 where the destination IP addresses 10.1.1.1 /32 and 10.1.1.2 /32 have been aggregated as a single address prefix 10.1.1.0 /24. In this embodiment, the FIB is configured to locate the same next-hop information 160 for any packet whose destination IP address begins with 10.1.1. By aggregating the prefixes in this manner, the fourth-level vector 140 is not needed in the MTRIE, and thus less memory may be allocated for the FIB than in the embodiment of FIG. 1A. Further, fewer MTRIE lookups need to be performed to locate the packet's next-hop information. In short, route aggregation reduces the number of address prefixes stored in the FIB and enables the FIB to be searched faster while consuming less memory.

Multi-Area Networks

A computer network may contain smaller groups of one or more subnetworks which may be managed as separate autonomous systems. As used herein, an autonomous system (AS) is broadly construed as a collection of interconnected network nodes under a common administration. Often, the AS is managed by a single administrative entity, such as a company, an academic institution or a branch of government. For instance, the AS may operate as an enterprise network, a service provider or any other type of network or subnetwork.

The AS may contain one or more edge devices (or "autonomous system border routers" (ASBR)), having peer connections to edge devices located in adjacent networks or subnetworks. Thus, packets enter or exit the AS through an appropriate ASBR. The AS may be logically partitioned into a plurality of different "routing areas." One routing area is usually designated as a "backbone area" (Area 0) through which nodes in other routing areas can communicate.

Network nodes located in the same routing area generally share routing information and network-topology information using an "interior gateway" routing protocol (IGP), such as a link-state protocol. Examples of conventional link-state protocols include, but are not limited to, the Open Shortest Path First (OSPF) protocol and the Intermediate-System-to-Intermediate-System (IS-IS) protocol. The OSPF protocol is described in more detail in Request for Comments (RFC) 2328, entitled *OSPF Version 2*, dated April 1998, which is publicly available through the Internet Engineering Task Force (IETF) and is hereby incorporated by reference in its entirety. The IS-IS protocol is described in more detail in the IETF publication RFC 1195, entitled *Use of OSI IS-IS for Routing in TCP/IP and Dual Environments*, dated December 1990, which is incorporated herein by reference in its entirety.

Conventional link-state protocols typically employ link-state advertisements (LSA) for exchanging routing and topology information between a set of interconnected intermediate network nodes, i.e., routers and switches. In fact, different types of LSAs may be used to communicate the routing and topology information. For example, the OSPF version 2 specification (RFC 2328) defines the following types of LSAs: Router, Network, Summary and AS-External LSAs. Router and Network LSAs are used to propagate link information within a routing area. Specifically, Router LSAs advertise router-interface links (i.e., links connected to routers) and their associated cost values, whereas Network LSAs advertise network-interface links (i.e., links connected to subnetworks) and their associated cost values within the routing area.

Summary and AS-External LSAs are used to disseminate routing information between routing areas. A Summary LSA is typically generated by an area border device, such as an area border router (ABR), located at the boundary of different routing areas. First, the ABR receives LSAs in a first routing area. The ABR "summarizes" routes advertised in the LSAs by aggregating the routes where possible. Next, the ABR stores the summarized routes in a Summary LSA, which it then advertises in a second routing area. In this way, nodes in the second area are made aware of routes that can be reached through the ABR. The OSPF specification defines a "type 3" and "type 4" Summary LSA. The type-3 Summary LSA advertises routes to reachable subnetworks; the type-4 Summary LSA advertises routes to reachable ASBRs. An AS-External LSA stores a list of reachable inter-AS ("external") routes, i.e., located outside of the AS. The AS-External LSA is typically generated by an ASBR and is propagated throughout the AS to identify which external routes can be reached through the advertising ASBR. Unlike Summary LSAs, routes stored in an AS-External LSA are generally not aggregated.

Although OSPF LSAs are described herein for purposes of discussion, those skilled in the art will understand that other link-state protocols may utilize different LSA formats. For instance, IS-IS link-state packets (LSP) generally advertise type-length-value (TLV) tuples, where each TLV may be configured to store routing or topology information for distribution within a single routing area, across different routing areas, or across AS boundaries. Those skilled in the art will also understand that routing and topology information may be disseminated in other types of OSPF LSAs besides those described above. For example, "opaque" LSAs provide an extensible LSA format for use with the OSPF protocol and are generally described in more detail in the IETF publication RFC 2370, entitled *The OSPF Opaque LSA Option*, published July 1998, which is hereby incorporated by reference as though fully set forth herein.

Each network node in a routing area typically maintains its own link-state data-base (LSDB). The LSDB is configured to store routing and topology information advertised with the node's routing area. Because an ABR (by definition) participates in multiple routing areas, each ABR maintains a separate LSDB for each of its routing areas. In operation, network nodes in a routing area "flood" LSAs to ensure that every node in that area populates its LSDB with the same set of routing and topology information. In this way, the area's network nodes share a consistent "view" of the network. Moreover, because Summary and AS-External LSAs are advertised across area boundaries, LSDBs of nodes located in different routing areas can maintain consistent sets of inter-area and inter-AS routing information.

Since consistent sets of intra-area, inter-area and inter-AS routing information are usually distributed among network nodes in an AS, the nodes can calculate consistent sets of "best paths" through the AS, e.g., using conventional shortest path first (SPF) calculations or other routing computations. A calculated best path corresponds to a preferred data path for transporting data between a pair of source and destination nodes. The preferred path may be an intra-area, inter-area or inter-AS data path, depending on the locations of the source and destination nodes. For inter-area routes, e.g., between ASBRs, the data may be transported over the preferred path using a tunneling mechanism, such as the Multi-Protocol Label Switching (MPLS) protocol. The MPLS protocol and its operation are described in more detail in Chapter 7 of the reference book entitled *IP Switching and Routing Essentials*, by Stephen Thomas, published 2002, which is hereby incorporated by reference as though fully set forth herein.

FIG. 2 illustrates an exemplary AS 200 having a plurality of different routing areas 210-230. In this exemplary AS configuration, a "backbone" routing area 210 (Area 0) is coupled to a first routing area 220 (Area 1) and second routing area 230 (Area 2). Thus, network nodes located in the areas 210 and 220 can send inter-area communications via the backbone area 210. To that end, each of the routing areas 220 and 230 includes at least one ABR 250 that can communicate in the backbone area, such as ABR1 (i.e., located between Areas 0 and 1) and ABR2 (i.e., located between Areas 0 and 2). The routing areas 220 and 230 also may include one or more ASBRs 240 adapted to send and receive inter-AS communications. For instance, the exemplary AS 200 may be configured as a RFC-2547 provider network that is coupled to a plurality of neighboring customer sites, as set forth in the IETF publication RFC 2547, entitled *BGP/MPLS VPNs*, by E. Rosen et al., published March 1999, which is hereby incorporated by reference in its entirety. In such an embodiment, the ASBRs 240 may be provider edge (PE) devices that provide virtual private network (VPN) connectivity between customer edge (CE) devices located in remote customer sites.

In accordance with a known technique for forwarding data across multiple routing areas, data may be tunneled from an ASBR1 located in Area 1 to an ASBR2 located in Area 2. An optimal end-to-end data path 205 between these ASBRs may be calculated, e.g., based on the result of an SPF calculation. Initially, ASBR1 forwards a data packet across Area 1 to ABR1. The packet may include a three-level MPLS label stack 260 having a top-most IGP label 262, an edge-device label 264 and a bottom-most VPN label 290. The IGP label 262 is used within Area 1 to identify ABR1 as the packet's destination within Area 1. The edge-device label 264 is used within Area 1 to identify ASBR2 as the packet's destination within AS 200. The VPN label 290 identifies to which customer site ASBR2 should forward the packet after the packet has traversed the entire length of data path 205.

After receiving the data packet, ABR1 performs a label-lookup operation based on the value of the edge-device label 264 to determine the packet's next destination within backbone Area 0. In this case, ABR1 determines that the packet should be forwarded to ABR2, i.e., the next ABR situated along data path 205. Before forwarding the packet, ABR1 may replace (or modify) the packet's MPLS label stack 260 with a new label stack 270 having an IGP label 272, an edge-device label 274 and the VPN label 290. The IGP label 272 is used within Area 0 to identify ABR2 as the packet's destination within Area 0. The edge-device label 274 is used within Area 0 to identify ASBR2 as the packet's destination within AS 200. The VPN label 290 is not changed. ABR2 receives the packet and, based on the value of the received edge-device label 274, determines that ASBR2 is the packet's destination within Area 2. Accordingly, ABR2 replaces the packet's label stack with a two-level MPLS label stack 280 having a top-most IGP label 282 that identifies ASBR2 as the packet's destination in Area 2 and a bottom-most VPN 290 that identifies to which customer site ASBR2 should forward the packet.

The IGP labels 262, 272 and 282 are usually distributed within their respective routing areas using a conventional label distribution protocol, such as the Resource Reservation Protocol (RSVP), Label Distribution Protocol (LDP) or the like. The VPN label 290 is distributed among the fully-meshed set of ASBRs 240, e.g., using Multi-Protocol BGP (MP-BGP) or any other well known protocol that may be adapted to distribute VPN labels. Although conventional protocols are typically used for distributing IGP and VPN labels, there currently is not a standardized protocol for distributing edge-device labels in multi-area networks.

U.S. Pat. Nos. 6,473,421 and 6,603,756, both entitled Hierarchical Label Switching Across Multiple OSPF Areas, by Daniel C. Tappan, respectively published Oct. 29, 2002 and Aug. 5, 2003, and which are both hereby incorporated by reference in their entireties, teach one technique that may be used to distribute edge-device labels across routing areas. According to this known technique, the edge-device labels may be communicated across OSPF routing areas using AS-External LSAs. More particularly, the AS-External LSAs store mappings of ASBR addresses with their corresponding edge-device label values. Since the AS-External LSAs are disseminated throughout all routing areas in the AS, the ASBR addresses and their edge-device labels can be communicated to each ABR and ASBR.

Although the above-noted edge-device label distribution technique works well, it requires certain AS configurations. For instance, because ASBR addresses are advertised in AS-External LSAs, Summary LSAs are not used to advertise the ASBR addresses. As a result, ASBR routes are not aggregated, and thus every ASBR route has to be separately installed in the network devices' FIBs and LSDBs. This inability to summarize the ASBR addresses may result in redundant FIB and LSDB entries (that otherwise could have been combined using route aggregation). The redundant FIB and LSDB entries, in turn, may increase memory consumption in the ABRs and ASBRs and further may increase their latencies of performing FIB lookups and routing computations, such as SPF calculations.

In addition, use of AS-External LSAs to advertise ASBR addresses also may lead to undesired LSA "looping" between area boundaries. Unlike Summary LSAs which are of area scope, the AS-External LSAs are flooded across multiple routing areas. As such, an AS-External LSA may originate in a first routing area, propagate out of that area, then eventually loop back into the first area. Such looping may lead to unnecessary consumption of network bandwidth and/or processing resources.

SUMMARY OF THE INVENTION

The present invention overcomes the disadvantages of the prior art by separately distributing edge-device labels and routing information across routing areas of a computer network. Because the edge-device labels are distributed separately from network routing information, the process of distributing the edge-device labels does not preclude conventional edge-device address summarizations. Consequently, unlike prior implementations, at least some edge-device routes in the network may be aggregated and advertised in conventional Summary LSAs. As such, fewer routes are installed in the FIBs of the network's devices, thereby consuming less memory in the devices and enabling faster FIB lookups. Furthermore, because route aggregation generally reduces the number of routes processed in the network, the network devices can perform faster and more efficient routing computations, such as SPF calculations.

Illustratively, a novel "label mapping" LSA is employed for distributing the edge-device labels across routing areas. The label-mapping LSA is preferably generated by an area border device, such as an ABR, and is preferably distributed only within a single routing area. For example, the label-mapping LSA may be embodied as an area-scope OSPF opaque LSA (type 10) or an IS-IS LSP containing TLVs of area scope. Because the novel label-mapping LSAs are of area scope, the inventive label distribution technique does not permit edge-device label information to "loop back" into a routing area.

In practice, an ABR participating in first and second routing areas may receive a label-mapping LSA from within the first routing area. The received label-mapping LSA identifies a set of edge-device addresses and a corresponding set of edge-device label values for use in the first routing area. After receiving the label-mapping LSA, the ABR may allocate a new set of label values to identify the edge devices within the second routing area. The ABR may store the new set of labels in a new label-mapping LSA which it then advertises within the second routing area. In addition, the ABR also may receive a Summary LSA from the first routing area, the Summary LSA identifying one or more edge-device addresses that are reachable in the first routing area. The ABR may re-summarize the received edge-device addresses and generate a new Summary LSA which it advertises in the second routing area. In this manner, the edge-device address summarizations (i.e., Summary LSAs) and edge-device label mappings (i.e., label-mapping LSAs) are distributed separately in both the first and second routing areas.

Advantageously, the present invention is generally applicable whenever label values are allocated to edge devices in a multi-area computer network and data is "tunneled" through the network from one edge device to another. Accordingly, the advantages of the invention may be realized in a variety of different network configurations including, but not limited to, layer-2 virtual private networks (L2VPN), layer-3 VPNs (L3VPN), pseudowire edge-to-edge emulations (PWE3), IPv4 or IPv6 over Multi-Protocol Label Switching (MPLS), VPNv6 over MPLS, BGP-4 core networks, RFC 2547 networks, etc.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

In accordance with the illustrative embodiments, edge-device labels are distributed separately from network routing information across routing areas of a computer network, such as an autonomous system. As such, the process of distributing the edge-device labels does not preclude conventional edge-device address summarizations between routing areas. Consequently, unlike prior implementations, at least some edge-device routes may be aggregated and advertised in conventional type-3 or type-4 Summary LSAs. Thus, fewer routes are installed in the network devices' FIBs, thereby consuming less memory in the devices and enabling faster FIB lookups. Furthermore, because route aggregation generally reduces the number of routes processed in the network, the network devices can perform faster and more efficient routing computations, such as SPF calculations.

Figure 1A:
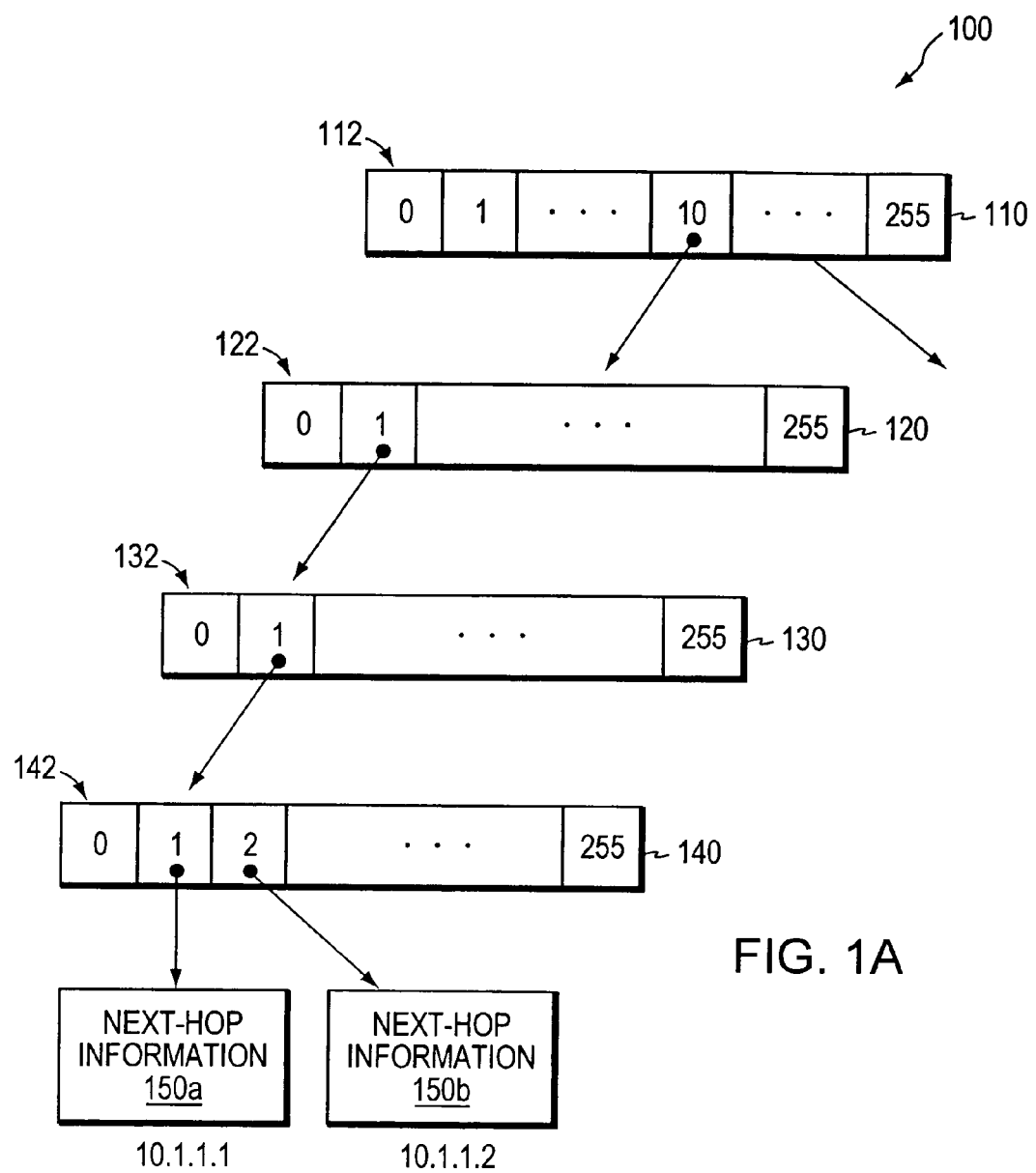
FIG. 1A, previously described, is a schematic block diagram of an exemplary IP-based FIB that may be used to determine a packet's next-hop forwarding information.
Figure 1B:
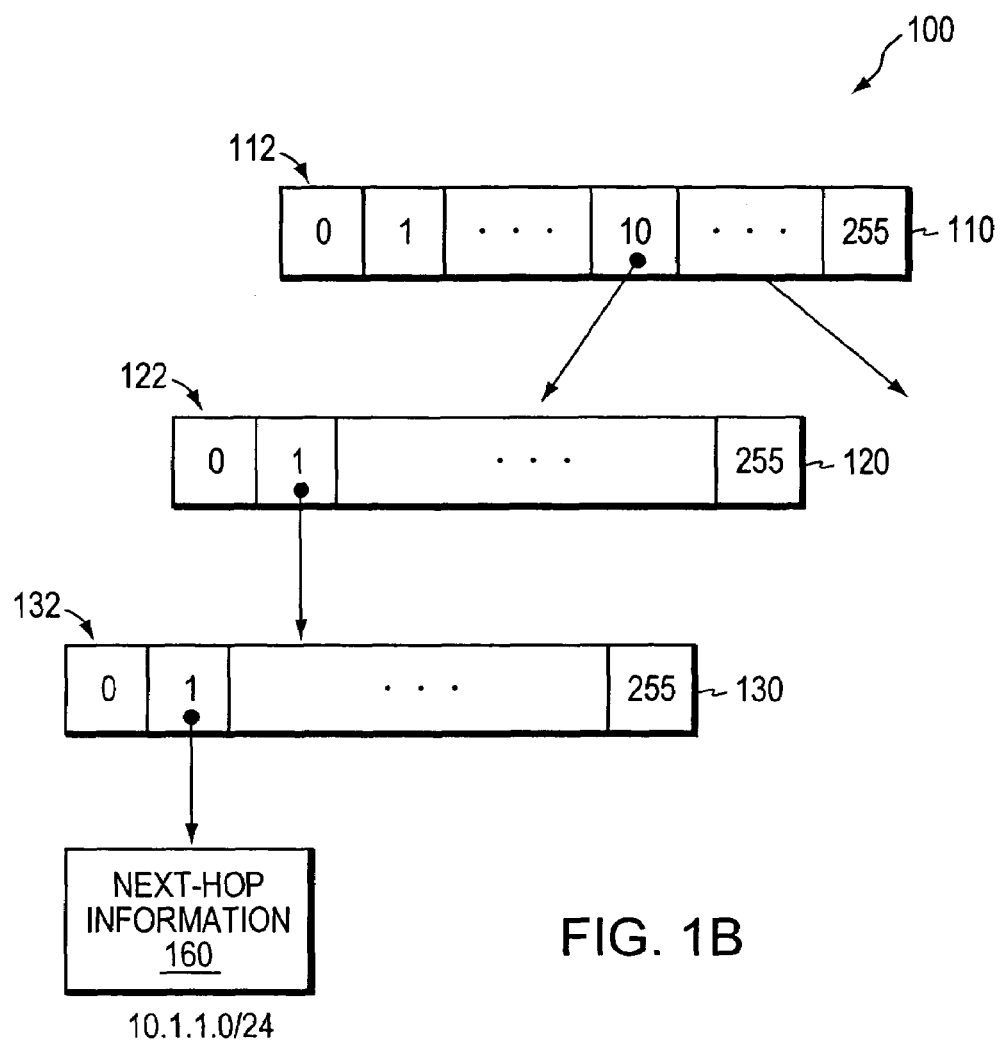
FIG. 1B, previously described, is a schematic block diagram of an exemplary IP-based FIB adapted to store summarized IP addresses.
Figure 2:
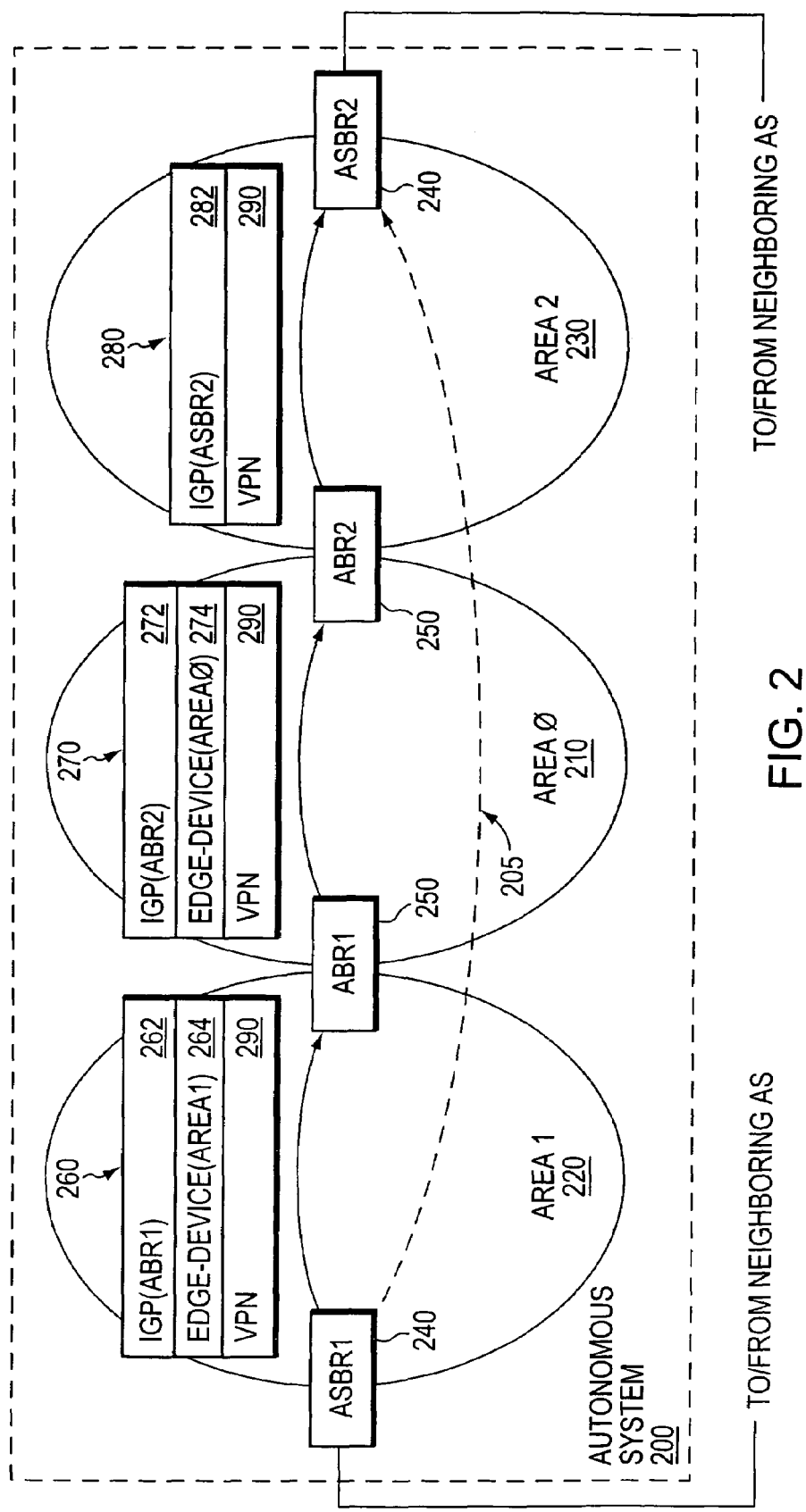
FIG. 2, previously described, is a schematic diagram of an exemplary autonomous system and illustrative label stacks that may be employed when forwarding data packets across multiple routing areas of the autonomous system.
Figure 3:
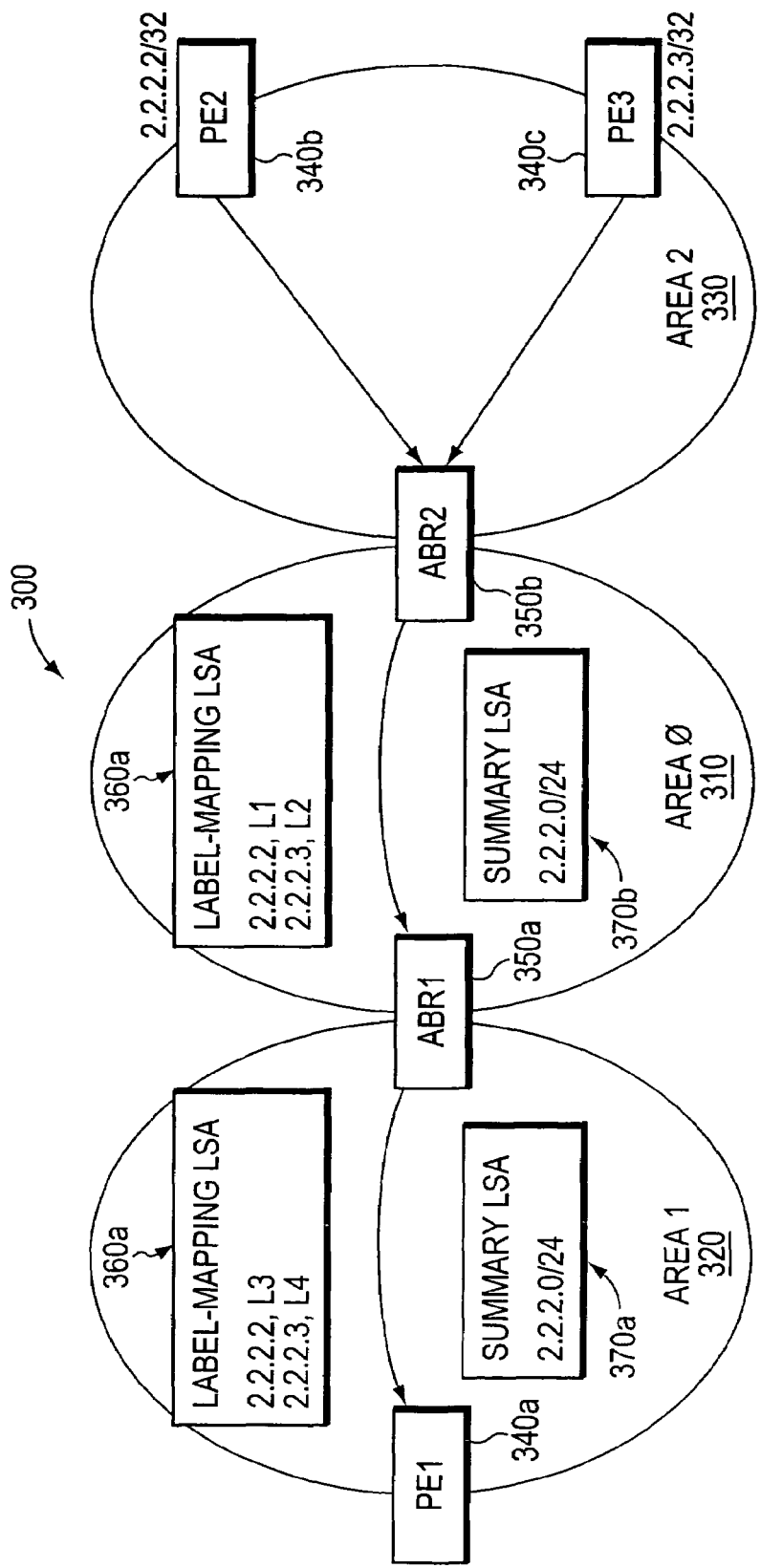
FIG. 3 is a schematic diagram of an exemplary multi-area autonomous system which may be used in accordance with an illustrative embodiment of the invention.

FIG. 3 illustrates an exemplary AS 300 having routing areas 320 and 330 (Areas 1 and 2) coupled to a backbone routing area 310 (Area 0). More specifically, the routing area 320 is coupled to the backbone area 310 by ABR1 350a and the routing area 330 is coupled to the backbone area by ABR2 350b. The exemplary AS 300 is preferably deployed as a RFC-2547 network which communicates with neighboring customer sites through provider edge devices PE1 340a, PE2

340*b* and PE3 340*c*. PE1, PE2 and PE3 are fully meshed at the BGP-level and preferably exchange VPNv4 routes and VPN labels using internal BGP (iBGP) messages. In addition, each PE device 340 is also configured to communicate within its respective routing area using an appropriate IGP protocol, such as OSPF or IS-IS. In the exemplary AS 300, MPLS label switched paths may be established between PE devices located in remote routing areas. For instance, PE1 may direct VPN traffic over an appropriate label-switched path (e.g., selected by a SPF computation) to reach either PE2 or PE3.

In operation, PE1 may receive data from a customer edge device (not shown) located in a customer site that participates in a first VPN. PE1 may forward the received data to PE2 or PE3 which also may be coupled to a customer site participating in the first VPN. To differentiate which PE device the received data is being forwarded in the AS 300, PE1 prepends an edge-device label that identifies a particular destination PE device. For example, if PE1 determines that the received data should be forwarded to PE2, then the received data is prepended with an edge-device label corresponding to PE2. In this manner, the edge-device label ensures that the received data is directed to correct destination PE device, even if the received data is forwarded across multiple routing areas in the AS 300.

In accordance with an illustrative embodiment, PE1 "learns" edge-device label values corresponding to PE2 and PE3, as follows. First, ABR2 determines the IP addresses of the devices PE2 and PE3, e.g., based on the contents of Router and/or Network LSAs advertised in the Area 2. In response to determining the IP addresses of PE2 and PE3, ABR2 generates both a Summary LSA 370*b* and a novel label-mapping LSA 360*b*. The Summary LSA 370*b* stores one or more summarized edge-device addresses, such as for the devices PE2 and PE3. For example, as shown, PE2 is assigned an IP address 2.2.2.2 and PE3 is assigned an IP address 2.2.2.3. In this case, the Summary LSA 370*b* stores a prefix 2.2.2.0 /24 that summarizes the IP addresses of PE2 and PE3.

ABR2 allocates a separate edge-device label for each edge-device address that it determines is reachable in the Area 2. A mapping of the edge-device label values and their corresponding edge-device addresses are stored in the label-mapping LSA 360*a*. In other words, the label-mapping LSA 360*b* maps PE addresses in the Area 2 with their corresponding edge-device label values for use in the Area 0. In this example, the label-mapping LSA 360*b* is shown containing a mapping of the IP address of PE2 with an edge-device label value L1 and the IP address of PE3 with an edge-device label value L2.

The Summary LSA 370*b* and the label-mapping LSA 360*b* are both of area scope and are flooded within Area 0. Since ABR1 resides in both Area 1 and Area 0, ABR1 receives both the Summary LSA 370*b* and the label-mapping LSA 360*b*. Notably, ABR1 also may receive Summary LSAs and label-mapping LSAs from other ABRs (not shown) residing in the backbone routing area 310. In the event that ABR1 receives multiple Summary LSAs from the Area 0, ABR1 may re-summarize the summarized prefixes it has received. For simplicity, assume that ABR1 has not received other Summary LSAs besides Summary LSA 360*b* and thus ABR1 creates a new Summary LSA 370*a* containing the same summarized prefix, i.e., 2.2.2.0 /24, as in the Summary LSA 370*b*. ABR1 floods this new Summary LSA 370*a* throughout Area 1. In addition, ABR1 also generates a new label-mapping LSA 360*a* to advertise edge-device label values for use in the Area 1. The label-mapping LSA 360*a* may contain different label values than were advertised in the Area 0. For instance, in this example, the label-mapping LSA 360*a* maps PE2 with an edge-device label value L3 and PE3 with an edge-device label value L4.

Both the Summary LSA 370*a* and the label-mapping LSA 360*a* are received by PE1. The Summary LSA 370*a* notifies PE1 to forward data to ABR1 if the data is addressed to a destination IP address covered by the summarized route 2.2.2.0 /24. The label-mapping LSA 360*a* informs PE1 of which edge-device labels values to use for data addressed to PE2 or PE3. Having received the LSAs 360*a* and 370*a*, PE1 can determine appropriate MPLS label stacks for forwarding VPN traffic addressed to either PE2 or PE3. Notably, VPN labels may be distributed among the fully-meshed PE devices 340, e.g., using a known protocol such as MP-BGP, and IGP labels may be distributed within the individual routing areas 310-330, e.g., using a conventional label-distribution protocol such as LDP or RSVP.

Figure 4:
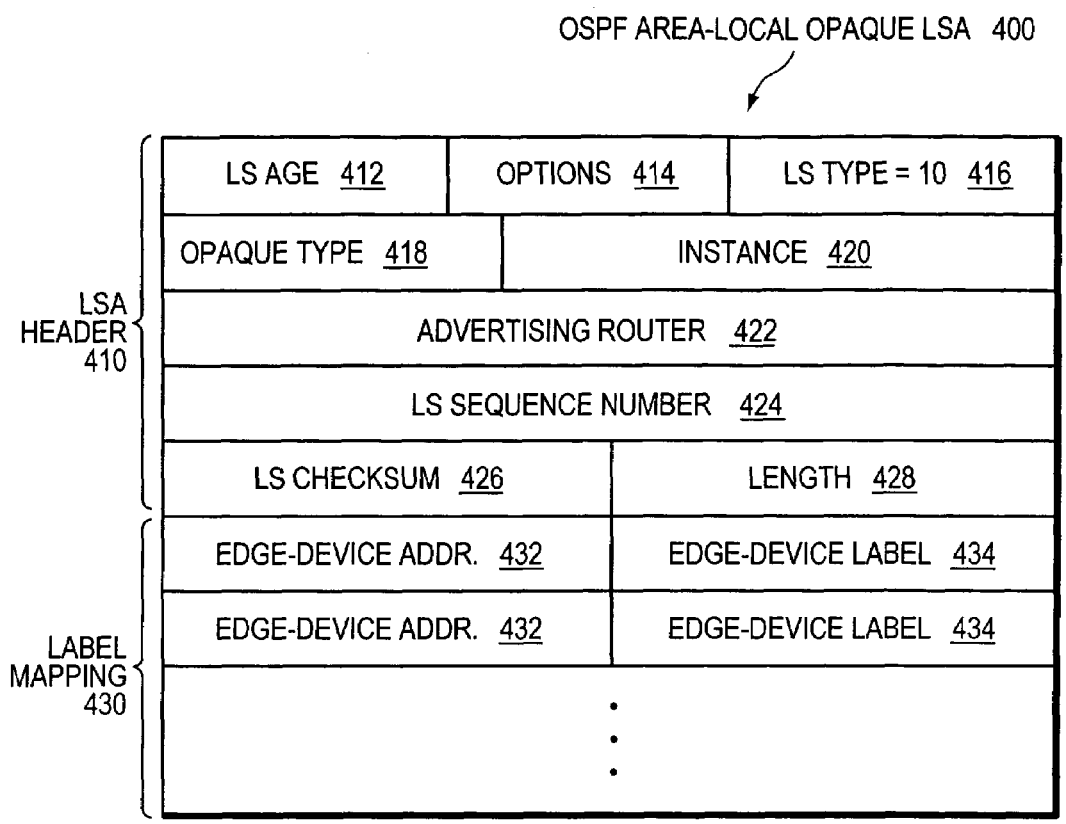
FIG. 4 is a schematic block diagram of an exemplary OSPF area-local opaque LSA that may be used to embody the novel label-mapping LSA depicted in the multi-area autonomous system of FIG. 3.

FIG. 4 illustrates an exemplary OSPF area-local opaque LSA 400 that may be used to embody the novel label-mapping LSA in accordance with the illustrative embodiments. The LSA 400 is formatted as a type-10 opaque LSA, which is defined in the above-incorporated RFC 2370, entitled *The OSPF Opaque LSA Option*. The opaque LSA 400 includes a LSA header 410 and one or more edge-device label mappings 430. The header 410 includes a link-state (LS) age field 412, an options field 414, an opaque-type field 418, an instance field 420, an advertising-router field 422, a LS sequence number field 424, a LS checksum field 426 and a length field 428. The LS age field 412 stores an age value, e.g., usually in seconds, that may be used to determine whether the LSA 400 is valid. The age value is typically initialized to zero and incremented, e.g., by one every second, until it reaches a predetermined maximum value, thereby indicating that the LSA has become invalid. The options field 414 stores a plurality of flag values that may be used to signal whether certain capabilities are supported by the LSA's advertising router. For instance, one flag may indicate whether the advertising router is configured to received and forward opaque LSAs.

The type field 416 equals 10 to indicate that the LSA 400 has area-wide scope, and therefore cannot be flooded beyond the routing area into which it is initially flooded. The opaque-type field 418 stores a value that identifies the LSA 400 as a label-mapping LSA. If the LSA 400 has been divided into multiple instances, the instance field 420 stores a value that identifies a particular instance of the LSA. For example, the LSA 400 may be divided into two or more instances if the label mappings 410 exceed the maximum packet size allowed in a routing area. The advertising-router field 422 stores a is value, such as a loopback IP address, that identifies the router that generated and originally broadcast the LSA 400. The LS sequence number field 424 stores a sequence number indicating the relative version of the LSA. Typically, the sequence number is incremented, e.g., by one, for every new version of the LSA. The LS checksum field 426 stores a checksum (or other data integrity check) that may be used to validate the contents of the LSA. The length field 428 stores the length, e.g., in bytes, of the LSA 400.

The label mappings 430 store one or more pairs of edge-device addresses 432 and their corresponding edge-device label values 434. Because the label-mapping LSA 400 is of area scope, the edge-device label values are preferably valid only within the routing area in which the LSA is flooded. Those skilled in the art will appreciate that each pair of edge-device addresses 432 and edge-device labels 434 alternatively may be stored in various formats other than that shown. Further, the edge-device addresses and labels also may be associated with other information (not shown) that may be transported in the LSA 400.

Figure 5:
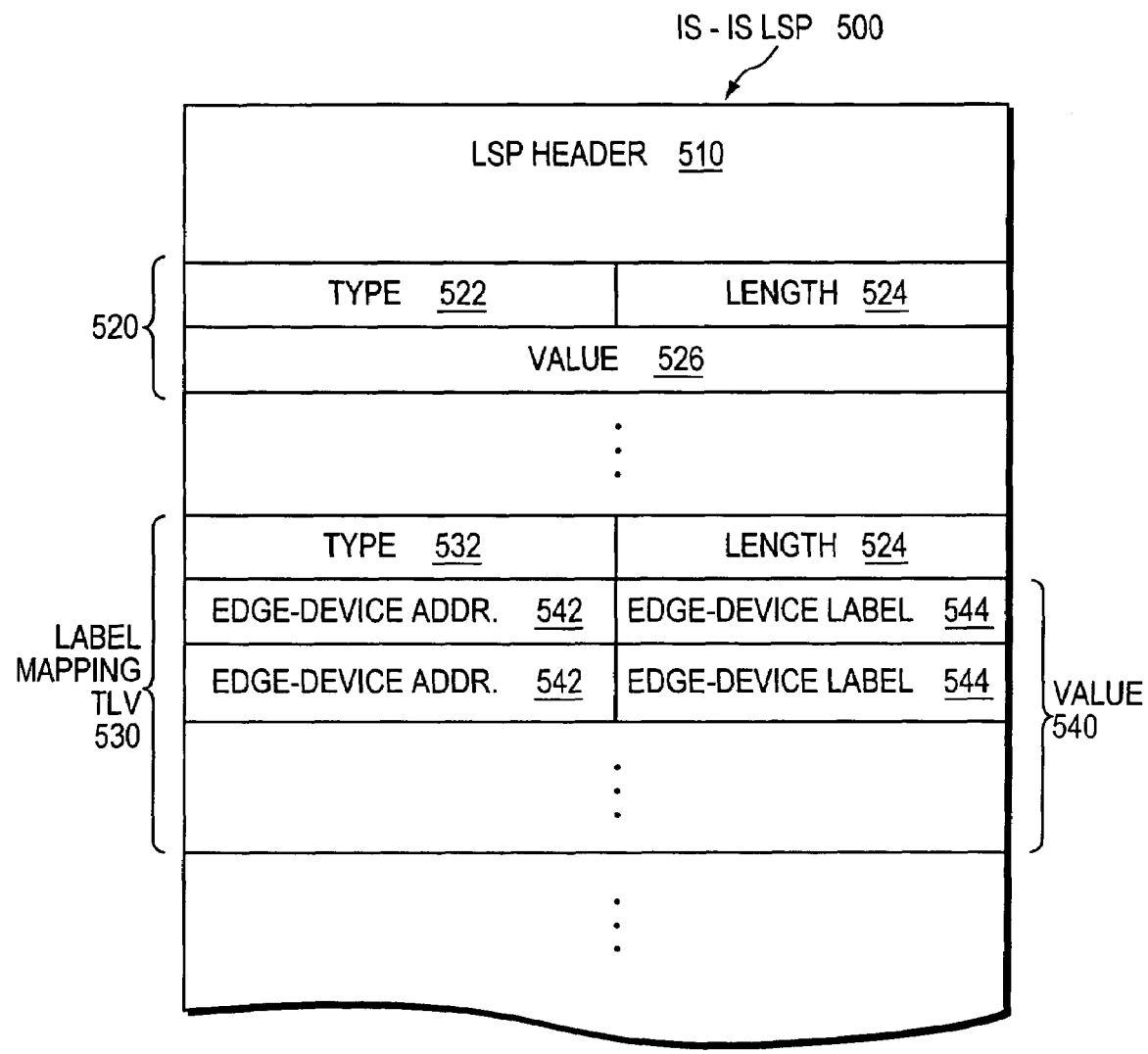
FIG. 5 is a schematic block diagram of an exemplary IS-IS link-state packet that may be used to embody the novel label-mapping LSA depicted in the multi-area autonomous system of FIG. 3.

FIG. 5 illustrates an exemplary IS-IS link state packet (LSP) 500 that may be used 30 embody the novel label-mapping LSA in accordance with the illustrative embodiments. The LSP 500 comprises a conventional LSP header 510 and one or more TLV tuples 520. The LSP header 510 stores, among other things, the LSP's IS-IS version number, sequence number and relative "age" as well as authentication data and other packet-related information. Each TLV tuple 520 includes a type field 522, a length field 524 and a value field 526. The type field 522 indicates what type of information is stored in the value field 526. The length field 524 identifies the length, usually in octets, of the TLV 520. The value field 526 stores the specific value transported by the TLV.

Consider the exemplary label-mapping TLV 530. The type field 532 identifies the TLV as containing edge-device label mappings, and further indicates that the TLV's value field 540 stores information to be disseminated only within a single routing area. The length field 534 stores the length of the TLV 530. The value field 540 stores one or more mappings of edge-device addresses 542 and corresponding edge-device label values 544. Of course, other data formats alternatively may be used to store the label mappings in the value field 540, and the value field also may be configured to store other information (not shown) besides the edge-device label mappings.

Figure 6:
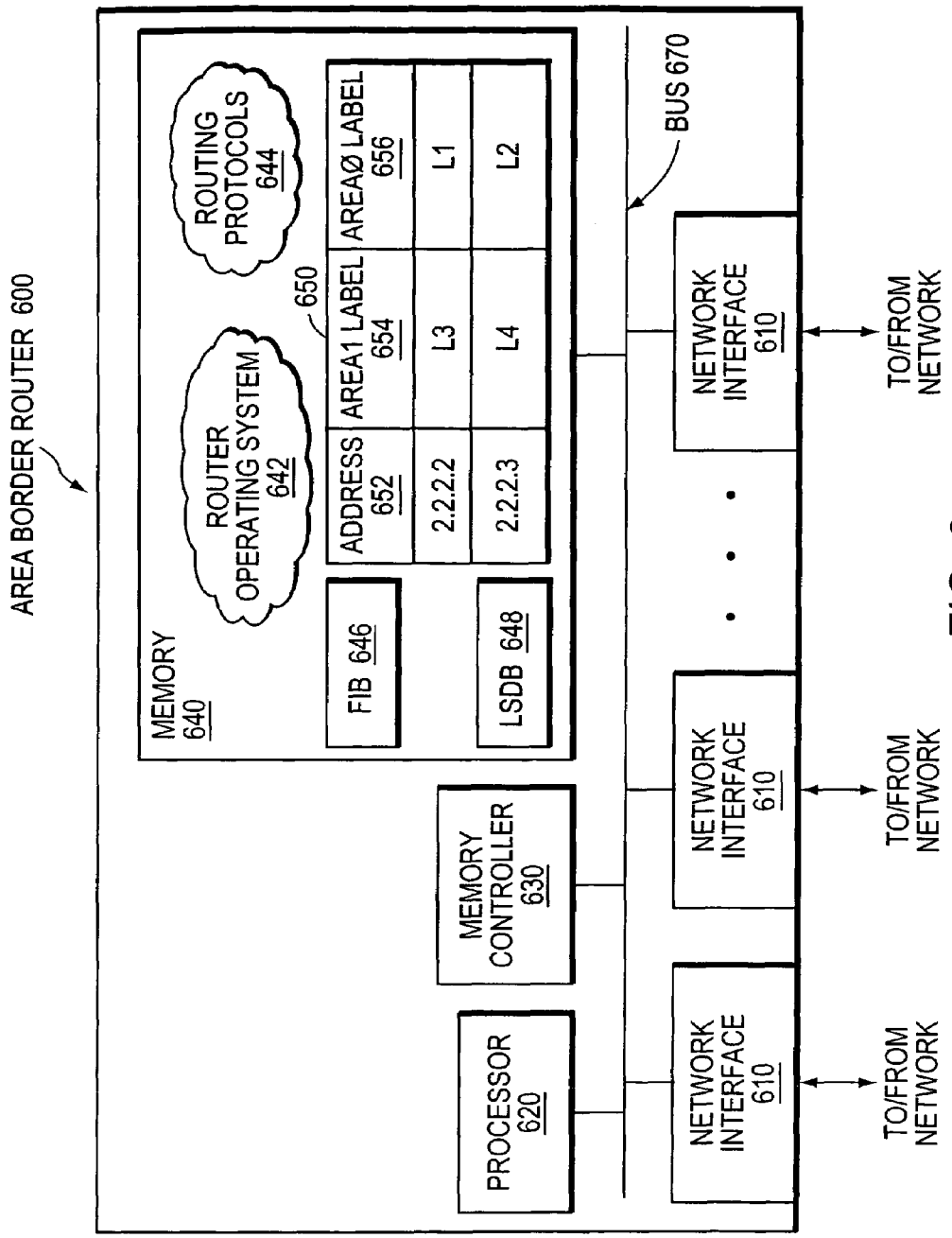
FIG. 6 is a schematic block diagram of an exemplary ABR that may be advantageously used in accordance with the illustrative embodiments.

FIG. 6 is a schematic block diagram of an exemplary ABR 600 that may be advantageously used in an illustrative embodiment. For ease of illustration and description, the ABR 600 is illustrated on a generic hardware platform. However, in alternative embodiments, the ABR may contain a plurality of line cards which are interconnected with a route processing engine through a switching fabric (i.e., backplane logic and circuitry). Accordingly, those skilled in the art will understand that the depicted ABR 600 is merely exemplary and that the advantages of the present invention may be realized on a variety of different hardware platforms having various software capabilities.

The ABR 600 comprises one or more network interfaces 610, a processor 620, a memory controller 630 and a memory 640 interconnected by a system bus 670. Each network interface 610 may be a physical or logical interface that connects the ABR 600 with a neighboring network node in a routing area. Each network interface 610 may be adapted to transfer and acquire data packets to and from various types of data links such as, e.g., Fast Ethernet (FE), Gigabit Ethernet (GE), wireless links, optical links, etc. The interfaces 610 may be configured to communicate over their data links using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 640 comprises a plurality of storage locations that are addressable by the processor 620 and the network interfaces 610 via the memory controller 630. The memory 640 preferably comprises a form of random access memory (RAM) that is generally cleared by a power cycle or other reboot operation (e.g., it is a "volatile" memory). For instance, the memory 640 may comprise dynamic RAM (DRAM) and/or synchronous DRAM (SDRAM) storage locations adapted to store program code and data structures accessible to the processor 620. It will be apparent to those skilled in the art that the memory 640 also may comprise other memory means, including various computer-readable media, for storing program instructions and data structures pertaining to the operation of the ABR 600. Further, those skilled in the art will appreciate that at least some portions of the memory 640 may be embodied as electromagnetic signals that are transmitted to or from a remote memory element (not shown).

The memory 640 stores, among other things, computer-readable instructions for implementing a routing operating system 642 that functionally organizes the ABR 600 by, e.g., invoking network operations in support of software processes and services executing on the processor 620. These services and processes may include various routing protocols 644, such as interior gateway routing protocols used to update routing and forwarding information available to the operating system. The operating system 642 renders forwarding decisions for received data packets based on its available routing and forwarding information. For instance, the operating system may maintain a FIB 646 that stores such packet-forwarding information. The IOS™ operating system by Cisco Systems Incorporated is one example of an operating system 642 that may be stored in the memory 640 and executed in accordance with the illustrative embodiments herein.

The routing protocols 644 may include one or more link-state IGP protocols, such as OSPF or IS-IS. Because the ABR 600, by definition, participates in more than one routing area, the memory 640 may include a separate IGP protocol instance 644 for each routing area in which it participates. For instance, since ABR1 is situated between routing areas 310 and 320 (in FIG. 3), ABR1 may execute separate IGP protocol instances for each of the routing areas 310 and 320. For example, ABR1 may execute the OSPF protocol within the routing area 310, whereas it executes the IS-IS protocol in the routing area 320.

The memory 640 may be configured to store one or more protocol-specific LSDBs 648 for the IGP protocol instances 644 executing in the ABR. Each LSDB 648 is configured to store reachability information and various cost metrics associated with data links and network nodes in a routing area. In general, when a LSA is received at a network interface 610, the contents of the received LSA is stored in an appropriate LSDB. For example, ABR1 may be configured to store the contents of Network, Router, Summary and AS-External LSAs received in the routing area 320 in a LSDB 648 containing routing information for the routing area 320. Routing information stored in the LSDB may be input to a SPF calculation in order to identify lowest-cost paths through the network. Further to the illustrative embodiments, each LSDB 648 also may store label-mapping LSAs which are not input to the conventional SPF calculations. Thus, although the edge-device label mappings area stored in the LSDB, they do not affect the latency of performing SPF calculations.

The memory 640 also may be configured to store a label-mapping table 650 that maps edge-device addresses with their corresponding edge-device label values used in different routing areas. For purposes of illustration and discussion, the exemplary table 650 is shown containing label-mapping information for the ABR1 in FIG. 3. In particular, the table 650 stores edge-device addresses 652 and their corresponding edge-device label values 654 and 656 which are respectively used in the routing areas 320 and 310 (Areas 1 and 0). For example, the table 650 indicates that the loopback IP address (2.2.2.2) advertised by PE2 is associated with an edge-device label value equal to L3 for use in Area 1 and with an edge-device label value equal to L1 for use in Area 0. Similarly, the label-mapping table 650 also indicates that the loopback IP address (2.2.2.3) advertised by PE3 is associated with an edge-device label value equal to L4 for use in Area 1 and with an edge-device label value equal to L2 for use in Area 0.

Figure 7:
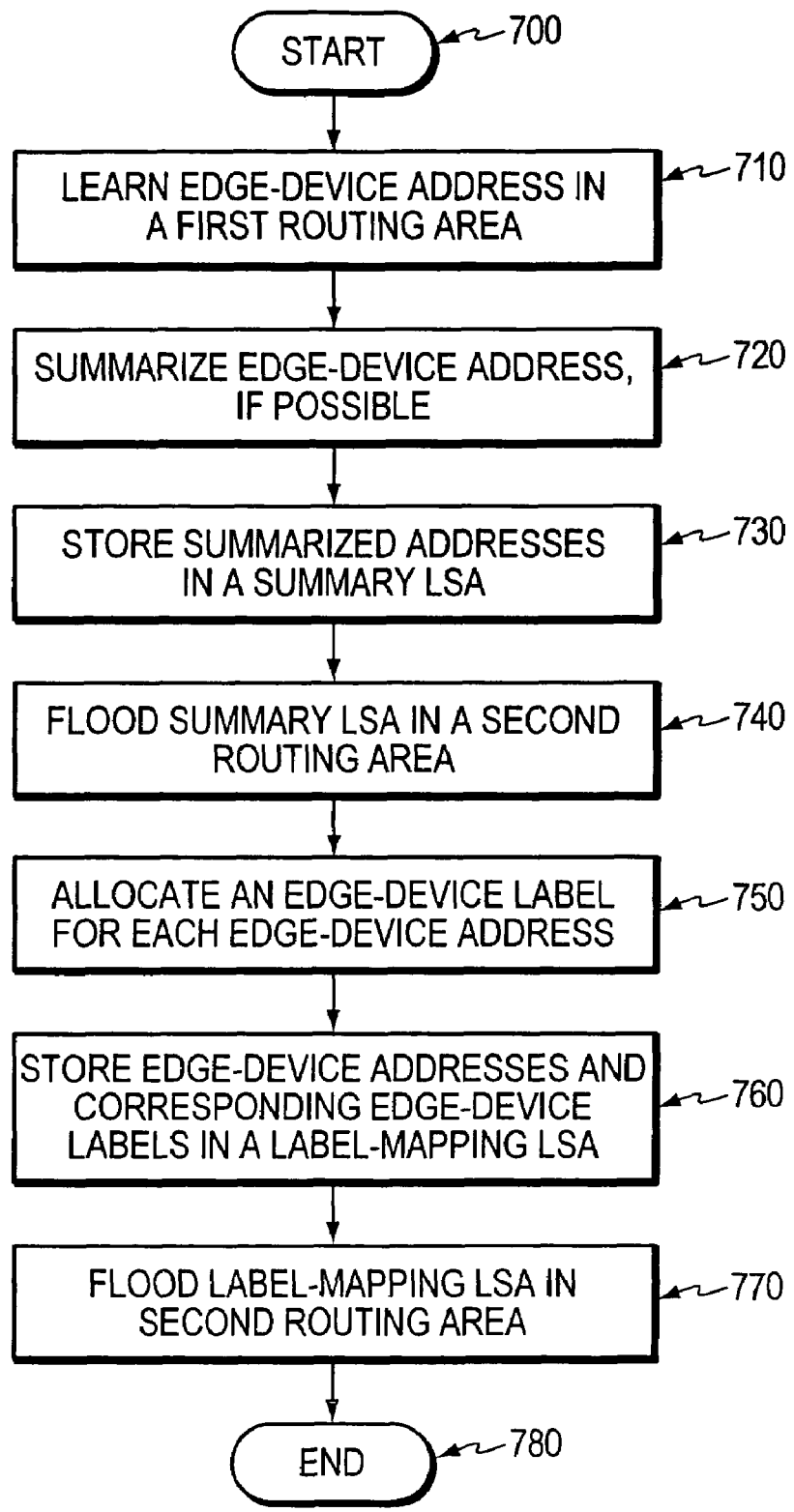
FIG. 7 is a flowchart illustrating a sequence of steps for identifying edge-device addresses in a first routing area and advertising those edge-device addresses and their corresponding edge-device label values in a second routing area.

FIG. 7 illustrates a sequence of steps that may be performed by an ABR that identifies edge-device addresses in a first routing area and advertises those edge-device addresses and their corresponding edge-device label values in a second routing area, in accordance with the illustrative embodiments. The sequence starts at step 700 and proceeds to step 710 where the ABR learns edge-device addresses in the first routing area. For instance, the edge-device addresses may be determined based on the contents of one or more Network or Router LSAs flooded (i.e., advertised) within the first routing area. At step 720, the learned edge-device addresses are summarized (i.e., aggregated), if possible. The summarized addresses are stored in a type-3 or type-4 Summary LSA, at step 730. Then, at step 740, the Summary LSA is flooded in the second routing area. At step 750, the ABR allocates an edge-device label value for each learned edge-device address. The edge-device addresses and their corresponding label values are stored in a novel label-mapping LSA, at step 760. The label-mapping LSA is flooded in the second routing area at step 770. The sequence ends at step 780.

Figure 8:
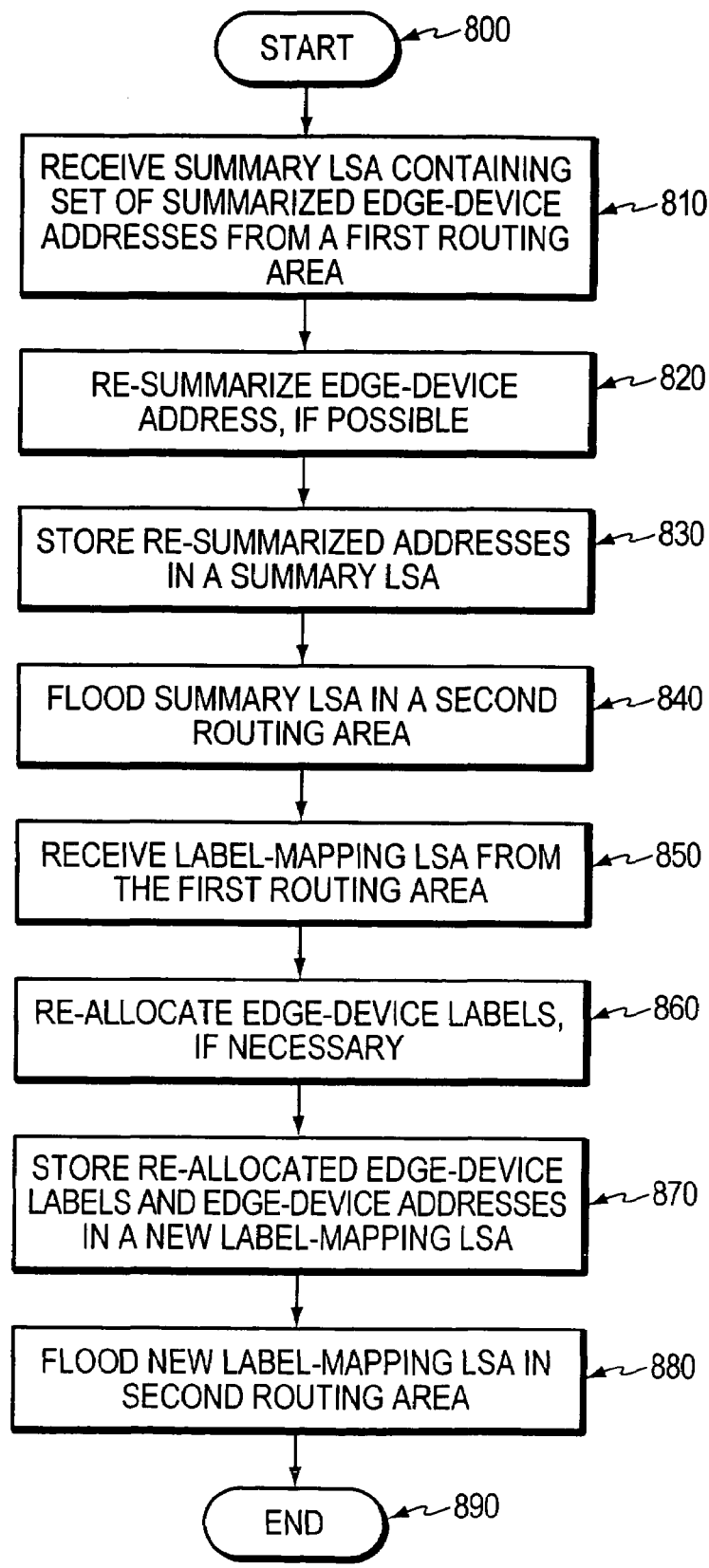
FIG. 8 is a flowchart illustrating a sequence of steps that may be performed by an ABR that receives both a Summary LSA and a label-mapping LSA in accordance with the illustrative embodiments.

FIG. 8 illustrates a sequence of steps that may be performed by an ABR that receives both a Summary LSA and a label-mapping LSA in accordance with the illustrative embodiments. The sequence begins at step 800 and advances to step 810 where the ABR receives a Summary LSA containing a set of summarized edge-device addresses that are reachable within a first routing area. Because the ABR also may have received other Summary LSAs and/or Network and Router LSAs identifying edge-device addresses from the first routing area, the ABR may be able to re-summarize the edge-device addresses, if possible, at step 820. The re-summarized addresses are stored in a Summary LSA, at step 830. Then, at step 840, the Summary LSA is flooded in a second routing area. The ABR also receives a label-mapping LSA from within the first routing area., at step 850. In response to receiving the label-mapping LSA, the ABR may reallocate a new set of edge-device labels for use in the second routing area, at step 860. The reallocated edge-device labels and their corresponding edge-device addresses are stored in a new label-mapping LSA, at step 870. Then, at step 880, the new label-mapping LSA is flooded in the second routing area. The sequence ends at step 890.

Figure 9:
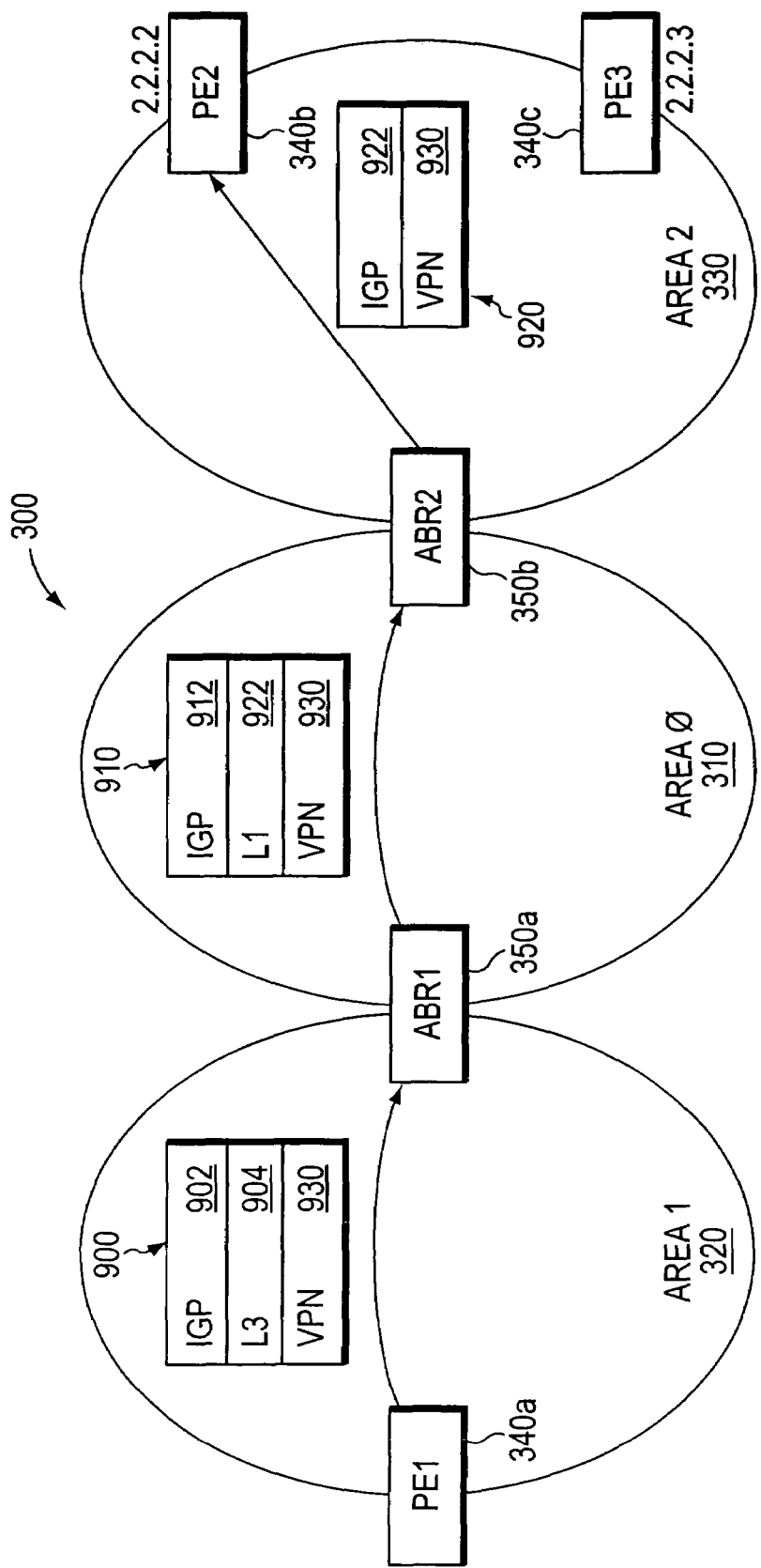
FIG. 9 is a schematic diagram of an exemplary label switched path over which data packets may be forwarded across routing areas in the exemplary autonomous system of FIG. 3.

FIG. 9 illustrates an exemplary MPLS label switched path over which data packets may be forwarded from PE1 to PE2 in the AS 300, using edge-device labels distributed in accordance with an illustrative embodiment. Notably, the label switched path may be calculated, e.g., based on the result of an SPF calculation. Initially, PE1 forwards a data packet across Area 1 to ABR1. The packet includes a three-level MPLS label stack 900 having a top-most IGP label 902, an edge-device label 904 and a bottom-most VPN label 930. The IGP label 902 is used within Area 1 to identify ABR1 as the packet's destination within Area 1. The edge-device label 904 is used within Area 1 to identify PE2 as the packet's destination within AS 300. The edge-device label 904 is determined based on the contents of the label-mapping LSA 360*a* previously received by PE1. In this example, an edge-device label value equal to L3 is allocated for PE2. The VPN label 930 identifies to which customer site PE2 should forward the packet.

After receiving the data packet, ABR1 performs a label-lookup operation, e.g., in its label-mapping table 650, based on the value of the edge-device label 904 to determine the packet's next destination within backbone Area 0. In this case, ABR1 determines that the packet should be forwarded to ABR2, i.e., the next ABR situated along the packet's MPLS label switched path. Before forwarding the packet, ABR1 may replace (or modify) the packet's MPLS label stack 900 with a new label stack 910 having an IGP label 912, an edge-device label 922 and the VPN label 930. The IGP label 912 is used within Area 0 to identify ABR2 as the packet's destination within Area 0. The edge-device label 922 is used within Area 0 to identify PE2 as the packet's destination within AS 300. Here, ABR1's label-mapping table 650 indicates that the packet's label stack 910 should include an edge-device label value equal to L1. The VPN label 930 is not changed. ABR2 receives the packet and, based on the value of the received edge-device label 922, determines that PE2 is the packet's destination within Area 2. Accordingly, ABR2 replaces the packet's label stack with a two-level MPLS label stack 920 having a top-most IGP label 922 that identifies PE2 as the packet's destination in Area 2 and the bottom-most VPN 930 that identifies to which customer site PE2 should forward the packet.

Figure 10A:
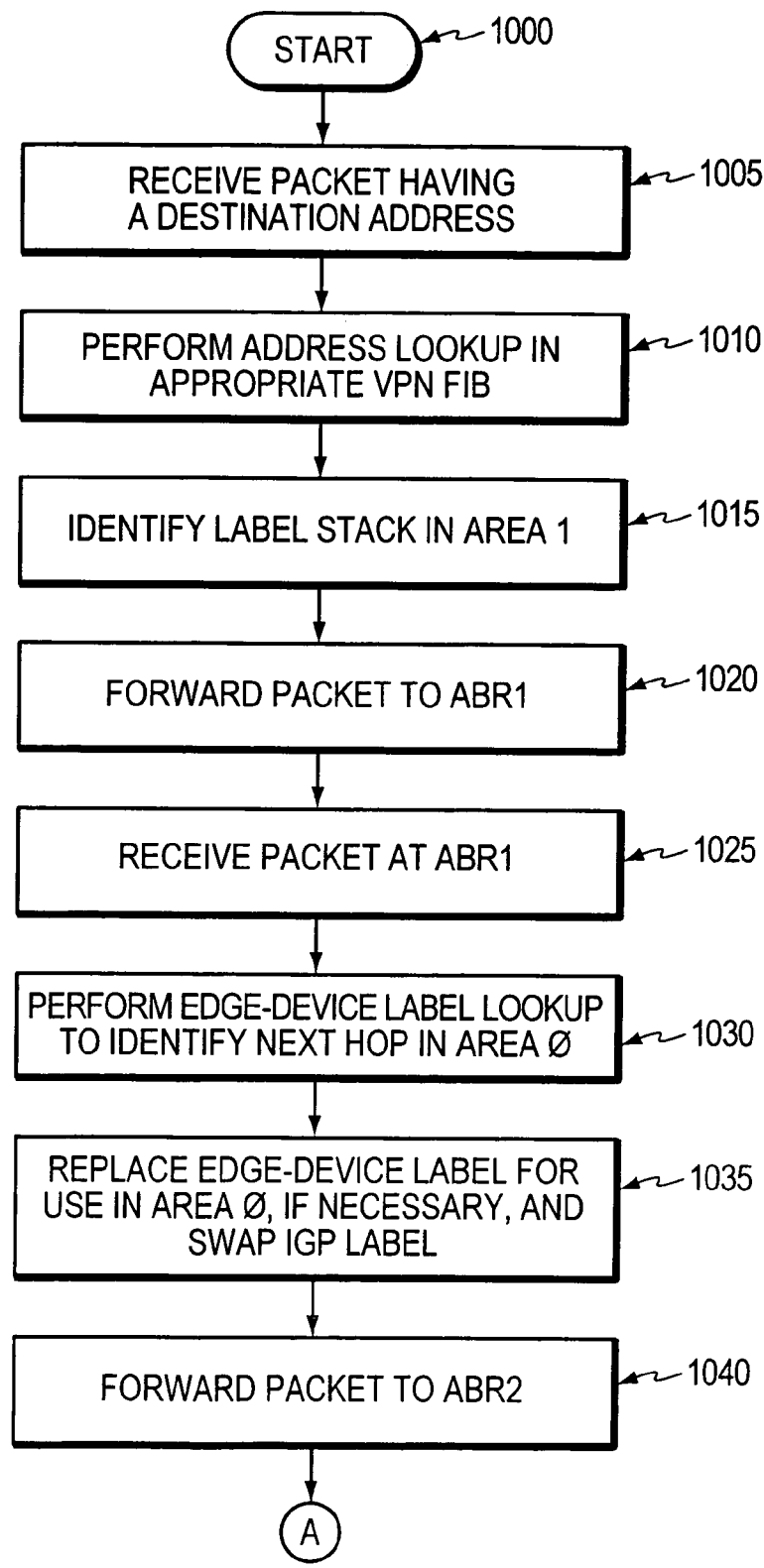
FIGS. 10A-B are a flowchart illustrating a sequence of steps for forwarding data packets using edge-device labels that have been distributed in accordance with the illustrative embodiments.
Figure 10B:
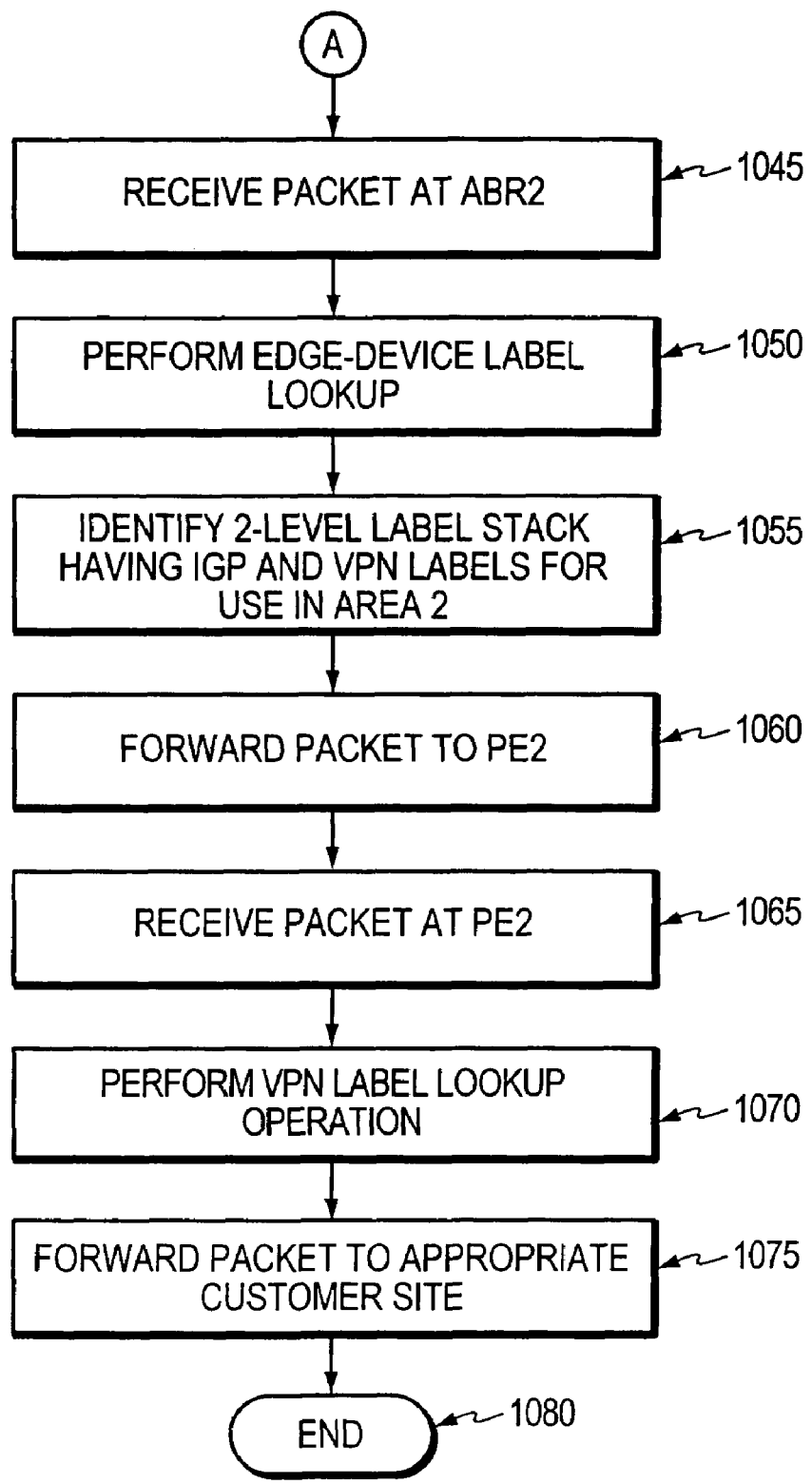

FIGS. 10A-B are a flowchart illustrating a sequence of steps for forwarding a data packet from PE1 to PE2 using edge-device labels that have been distributed in accordance with an illustrative embodiment. The sequence starts at step 1000 and proceeds to step 1005 where PE1 receives a VPN data packet having a destination IP address. At step 1010, the PE device performs an address lookup and in an appropriate VPN FIB, i.e., corresponding to the customer-site VPN from which the packet was received. At step 1015, the next-hop information located as a result of the FIB lookup is used to identify an appropriate MPLS label stack 900 for forwarding the packet in Area 1. At step 1020, the label stack 900 is prepended to the packet and the packet is forwarded to ABR1.

ABR1 receives the packet, at step 1025. Then, at step 1030, ABR1 performs an edge-device label-lookup operation, e.g., in its label-mapping table 650, to identify an edge-device label value corresponding to the packet's next hop in the backbone Area 0. At step 1035, the packet's edge-device label 904 is replaced, if necessary, and its IGP label 902 is replaced with a new IGP label value 912 for use in Area 0. Next, the packet is forwarded across Area 0 to ABR2, at step 1040. At step 1045, ABR2 receives the packet. Then, at step 1050, ABR2 performs an edge-device label lookup operation in its local label-mapping table 650, and, based on the result of its label-lookup operation, at step 1055 ABR2 identifies a two-level MPLS label stack 920 used for forwarding the packet to PE2. At step 1060, the packet is forwarded to PE2, which, in turn, receives the packet at step 1065. PE2 performs a VPN label-lookup operation in a label forwarding table (e.g., LFIB), at step 1070. Based on the result of this label-lookup operation, the packet is forwarded to an appropriate CE device, at step 1075. The sequence ends at step 1080.

Advantageously, the present invention is generally applicable whenever label values are allocated to edge devices in a multi-area computer network and data is "tunneled" through the network from one edge device to another. Accordingly, the advantages of the invention may be realized in a variety of different network configurations including, but not limited to, layer-2 virtual private networks (L2VPN), layer-3 VPNs (L3VPN), pseudowire edge-to-edge emulations (PWE3), IPv4 or IPv6 over Multi-Protocol Label Switching (MPLS), VPNv6 over MPLS, BGP4 core networks, RFC 2547 networks, etc.

The foregoing has been a detailed description of illustrative embodiments of the invention. Various modifications and additions can be made without departing from the spirit and scope of the invention. For example, while the inventive edge-device label distribution technique has been illustratively described with respect to MPLS/VPN networks, it is also expressly contemplated that the invention may be deployed in other types of networks and subnetworks, such as autonomous systems, broadcast domains, routing areas, etc., that implement various network communication protocols. Moreover, the invention is broadly applicable in any computer networks that separately distribute edge-device label values and network routing information across multiple routing areas. Accordingly, the edge-device label values may be distributed using the novel label-mapping LSAs, as described herein, or using any other mechanism for separately distributing the edge-device labels from the inter-area routing information. For example, the edge-device label values may be disseminated among a set of ABRs and ASBRs using a pre-determined protocol or by static configuration, e.g., as determined by a system administrator.

It is expressly contemplated that the teachings of this invention can be implemented as software, including a computer-readable medium having program instructions executing on a computer, hardware, firmware, or a combination thereof. For instance, the invention may be implemented by a ABR 600 having one or more processors, some of which may reside on the network interfaces 610 or on line cards containing the network interfaces. Further, the memory 640 may be distributed among a plurality of different memory elements, both local and remote to the ABR 600. The inventive technique therefore may be implemented in various combinations of hardware and/or software. Accordingly, this description is meant to be taken only by way of example and not to otherwise limit the scope of the invention.

What is claimed is:

1. A method for distributing edge-device labels between first and second routing areas of a computer network, the computer network containing one or more edge devices that are reachable in the first routing area, the method comprising:
    identifying, in the first routing area, an edge-device address for each of the one or more edge devices;
    storing the identified edge-device addresses in a first message;
    distributing the first message in the second routing area to advertise, in the second routing area, the identified edge-device addresses;
    allocating a different edge-device label value for each identified edge-device address;
    storing the identified edge-device addresses and their corresponding edge-device label values in a second message; and
    distributing the second message in the second routing area to advertise, in the second routing area, the identified edge-device addresses and their corresponding edge-device label values.

2. The method of claim 1, wherein the step of distributing the first message in the second routing area to advertise the identified edge-device addresses further comprises:
    summarizing the identified edge-device addresses; and
    advertising the summarized edge-device addresses in the second routing area.

3. The method of claim 1, wherein the second message is formatted as an Open Shortest Path First (OSPF) opaque link-state advertisement.

4. The method of claim 1, wherein the second message is formatted as an Intermediate-System-to-Intermediate-System (IS-IS) link-state packet including a type-length-value (TLV) tuple configured to store the identified edge-device addresses and their corresponding edge-device label values.

5. The method of claim 1 wherein the first message is an Open Shortest Path First (OSPF) Summary link-state advertisement.

6. The method of claim 1, wherein the computer network is configured as a network selected from a group consisting of:
    a layer-2 virtual private network (L2VPN), a layer-3 VPN (L3VPN), a pseudowire edge-to-edge emulation (PWE3) based network, an Internet Protocol (IP) over Multi-Protocol Label Switching (MPLS) based network, a VPNv6 over MPLS based network, a BGP3 core network and a Request For Comments (RFC)-2547 based network.

7. The method of claim 1, further comprising:
    forwarding data packets in the second routing area using at least one of the edge-device labels distributed in the second routing area.

8. An area border device situated between first and second routing areas in a computer network, one or more edge devices being reachable in the first routing area, the area border device comprising:
    a processor;
    a first network interface adapted to communicate in the first routing area, the first network interface being configured to receive an edge-device address for each of the one or more edge devices that are reachable in the first routing area;
    a second network interface adapted to communicate in the second routing area; and
    a memory adapted to store instructions which are executable by the processor for performing the steps of:
        advertising a first message over the second network interface, the first message containing the edge-device addresses received at the first network interface;
        allocating a different edge-device label value for each received edge-device address; and
        advertising a second message over the second network interface, the second message containing the edge-device addresses and their corresponding edge-device label values.

9. The area border device of claim 8, wherein the memory further comprises instructions for performing the steps of:
    summarizing the received edge-device addresses;
    storing the summarized edge-device addresses in the first message; and
    advertising the first message containing the summarized edge-device addresses over the second network interface.

10. The area border device of claim 8, wherein the second message is formatted as an Open Shortest Path First (OSPF) opaque link-state advertisement.

11. The area border device of claim 8, wherein the second message is formatted as an Intermediate-System-to-Intermediate-System (IS-IS) link-state packet including a type-length-value (TLV) tuple configured to store the identified edge-device addresses and their corresponding edge-device label values.

12. The area border device of claim 8, wherein the first message is an Open Shortest Path First (OSPF) Summary link-state advertisement.

13. The area border device of claim 8, wherein the second network interface is further configured to receive a data packet containing a particular edge-device label value and the memory further comprises instructions for:
    performing a label-lookup operation based on the received data packet's particular edge-device label value; and
    forwarding the received data packet over the first network interface in response to the label-lookup operation.

14. The area border device of claim 8, wherein the area border device is an area border router.

15. An area border device situated between first and second routing areas in a computer network, one or more edge devices being reachable in the first routing area, the area border device comprising:
- means for receiving an edge-device address for each of the one or more edge devices that are reachable in the first routing area;
- means for storing the identified edge-device addresses in a first message;
- means for distributing the first message in the second routing area to advertise, in the second routing area, the received edge-device addresses;
- means for allocating a different edge-device label value for each received edge-device address; and
- means for storing the identified edge-device addresses and their corresponding edge-device label values in a second message;
- means for distributing the second message in the second routing area to advertise, in the second routing area, the received edge-device addresses and their corresponding edge-device label values.

16. A computer network, comprising:
- a first routing area through which one or more edge devices are reachable;
- a second routing area coupled to the first routing area;
- means for identifying, in the first routing area, an edge-device address for each of the one or more edge devices;
- means for storing the identified edge-device addresses in a first message;
- means for distributing the first message in the second routing area to advertise, in the second routing area, the identified edge-device addresses;
- means for allocating a different edge-device label value for each identified edge-device address; and
- means for storing the identified edge-device addresses and their corresponding edge-device label values in a second message;
- means for distributing the second message in the second routing area to advertise, in the second routing area, the identified edge-device addresses and their corresponding edge-device label values.

17. The computer network of claim 16, further comprising:
- means for summarizing the identified edge-device addresses; and
- means for advertising the summarized edge-device addresses in the second routing area.

18. The computer network of claim 16, further comprising:
- means for forwarding data packets in the second routing area using at least one of the edge-device labels distributed in the second routing area.

19. A computer-readable medium storing instructions for execution on a processor for the practice of a method of distributing edge-device labels between first and second routing areas of a computer network, the computer network containing one or more edge devices that are reachable in the first routing area, the method comprising:
- identifying, in the first routing area, an edge-device address for each of the one or more edge devices;
- storing the identified edge-device addresses in a first message;
- distributing the first message in the second routing area to advertise, in the second routing area, the identified edge-device addresses;
- allocating a different edge-device label value for each identified edge-device address;
- storing the identified edge-device addresses and their corresponding edge-device label values in a second message; and
- distributing the second message in the second routing area to advertise, in the second routing area, the identified edge-device addresses and their corresponding edge-device label values.

20. An apparatus comprising:
- a processor;
- a first network interface operable to communicate into a first routing area and to receive an edge-device address for one or more edge devices that are reachable in the first routing area;
- a second network interface operable to communicate into a second routing area; and
- a memory operable to store instructions that when executed by the processor,
    - summarize edge device addresses,
    - send a first link-state advertisement over the second network interface, the first link-state advertisement containing the summarized edge device addresses,
    - associate an edge-device label value to each received edge-device address, and
    - send a second link-state advertisement over the second network interface, the second link-state advertisement mapping the edge-device addresses to their associated edge-device label values.

21. The apparatus of claim 20, wherein the second link-state advertisement is formatted as an Open Shortest Path First (OSPF) opaque link-state advertisement.

22. The apparatus of claim 20, wherein the second link-state advertisement is configured to have an area-wide scope that prevents the link-state advertisement from being sent beyond the routing area into which it is initially sent.

23. The apparatus of claim 20, wherein first link-state advertisement is an Open Shortest Path First (OSPF) Summary link-state advertisement.

24. The apparatus of claim 20, wherein the instructions that when executed by the processor summarize edge device addresses operate to aggregate the edge device addresses by consolidating ranges of addresses.

\* \* \* \* \*

UNITED STATES PATENT AND TRADEMARK OFFICE
CERTIFICATE OF CORRECTION

PATENT NO. : 7,483,387 B2 Page 1 of 1
APPLICATION NO. : 11/135600
DATED : January 27, 2009
INVENTOR(S) : Jim Guichard It is certified that error appears in the above-identified patent and that said Letters Patent is hereby corrected as shown below:

Col. 10, Line 49, should read:

-- in a routing area. The advertising-router field 422 stores a --

Col. 11, Line 4, should read:

-- (LSP) 500 that may be used embody the novel label- --

Signed and Sealed this

Twenty-second Day of June, 2010

David J. Kappos
*Director of the United States Patent and Trademark Office*